United States Patent Office 3,264,550
Patented August 2, 1966

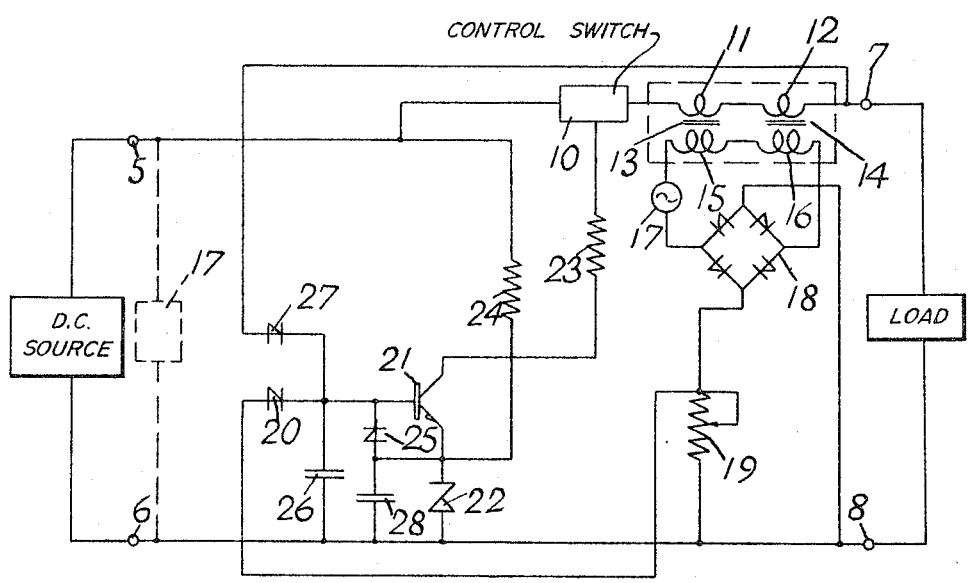

3,264,550
CURRENT REGULATORS
Derek Albert Paice, Hemel Hempstead, England, assignor to Rotax Limited, London, England
Filed Nov. 5, 1962, Ser. No. 235,268
Claims priority, application Great Britain, Nov. 7, 1961, 39,783/61
3 Claims. (Cl. 323—9)

The object of this invention is to provide in a convenient form a regulator for preventing the current flowing in a D.C. circuit from rising above a predetermined value.

A current regulator according to the invention comprises means for obtaining a voltage dependent on the current flow in a circuit, a capacitor to which said voltage is applied, means providing a fixed reference voltage, switching means for stopping current flow in the circuit when the voltage across the capacitor exceeds the fixed reference voltage by a predetermined amount, and means operable upon initially connecting the regulator to a source of power for ensuring that the reference voltage builds up to its fixed value in a period of time comparable to the time taken to charge the capacitor.

The accompanying drawings is a circuit diagram illustrating one example of the invention.

Referring to the drawing there are provided first and second terminals 5, 6 for connection to a source of direct or rectified alternating current so as to be of relatively positive and negative polarity in use respectively, and third and fourth terminals 7, 8 adapted for connection to an output circuit, the terminals 6, 8 being interconnected. The terminal 5 is connected to the terminal 7 through a control switch 10 in series with a pair of windings 11, 12. The windings 11, 12 are constituted by the secondary windings of a pair of series transducers 13, 14 the primary windings 15, 16 of which are connected in series with an alternator 17 to the input terminals of a full wave bridge rectifier 18. Conveniently the alternator 17 is in the form of an oscillator connected across the terminals 5, 6 as indicated in dotted lines in the drawing.

One output terminal of the bridge rectifier is connected directly to the terminal 8, whilst its other output terminals is connected to the terminal 8 through a resistor 19. A variable point on the resistor 19 is connected through a diode 20 to the base of an n-p-n- type transistor 21 the emitter of which is connected to the terminal 6 through a Zener diode 22, and the collector of which is connected to the control switch 10 through a resistor 23. The terminal 5 is further connected through a resistor 24 to the emitter of the transistor 21, and thence through a diode 25 to the base of the transistor. Moreover the Zener diode 22 is bridged by a capacitor 28.

In operation the transductors 13, 14 together with the bridge rectifier 18 act in known manner to develop across the resistor 19 a voltage proportional to the current flowing in the secondary windings 11, 12 of the transductors. This voltage is applied to the capacitor 26, and when the voltage across the capacitor 26 exceeds the fixed reference voltage across the Zener diode 22, the transistor 21 is rendered conductive and current flowing through the transistor 21 serves to switch off the control switch 10, thereby preventing further current flow to the output circuit, so that the mean current flow is not increased further.

On initially connecting the circuit to the source of power, the reference voltage across the Zener diode 22 is not established until the capacitor 28 is charged. During this period of time the reference voltage is provided by the capacitor 28 and is therefore maintained at a lower value than the normal value. By this means the risk of high current flowing in the output circuit during the time taken for the capacitor 26 to become charged is minimised, the capacitor 26, 28 being chosen so that the voltage across them builds up at approximately the same rate.

If desired the control switch 10 may be also opened to prevent current flow in the output circuit when the output voltage exceeds a predetermined value. For this purpose the terminal 7 is connected to the base of the transistor 21 through a diode 27, so that the voltage applied to the capacitor 26 is either the output voltage, or the voltage developed across the resistor 19, whichever is higher. Alternatively the voltage signal may be applied to a third capacitor connected between the base of the transistor and the terminal 6. Such an arrangement is preferable when the voltage and current signals require different degrees of smoothing.

Having thus described my invention what I claim as new and desire to secure by Letters Patent is:

1. A direct current circuit having combined therewith a current regulator for controlling current flow in said direct current circuit, said current regulator compising in combination means for obtaining a voltage dependent on the current flow in said direct current circuit, a capacitor to which said voltage is applied, a Zener diode in circuit with said capacitor, said Zener diode providing a fixed reference voltage, switching means for stopping current flow in said direct current circuit when the voltage across said capacitor exceeds said fixed reference voltage by a predetermined amount, and means operable when said direct current circuit is initially switched on for building up said reference voltage to its fixed value in a period of time comparable to the period of time taken to charge said capacitor.

2. A current regulating circuit comprising in combination a pair of input terminals, a direct current source connected across said input terminals, a pair of output terminals, a load connected across said output terminals, and a current regulator inter-connecting said input and output terminals, said current regulator comprising in combination means for obtaining a voltage dependent on the current flowing between said input and output terminals, a first capacitor to which said voltage is applied, a Zener diode, means connecting said Zener diode to said input terminals, the voltage across said Zener diode providing a fixed reference voltage when said Zener diode conducts, a transistor the emitter and base voltages of which are determined by said Zener diode and said first capacitor respectively, a control switch between the input and output terminals, means whereby said control switch is opened by current flow through said transistor when the latter conducts as a result of the voltage across said capacitor exceeding said fixed reference voltage by a predetermined amount, a second capacitor connected across said Zener diode, and means connecting said second capacitor to said input terminals, the reference voltage being provided by said second capacitor when the current regulator is initially connected to said direct current source, the voltage across said second capacitor building up to a value at which said Zener diode conducts in a period of time comparable with the time taken for said first capacitor to charge.

3. A current regulating circuit is claimed in claim 2, including in addition means for sensing the voltage across said output terminals, and means for rendering said transistor conductive when said output voltage exceeds said reference voltage by a fixed amount.

References Cited by the Examiner
UNITED STATES PATENTS

| | | | |
|---|---|---|---|
| 2,967,991 | 1/1961 | Deuitch | 323—22 |
| 3,040,239 | 6/1962 | Walker | 323—18 |

JOHN F. COUCH, *Primary Examiner.*

D. L. RAE, K. D. MOORE, *Assistant Examiners.*